(12) United States Patent
Anderson et al.

(10) Patent No.: US 7,950,613 B2
(45) Date of Patent: May 31, 2011

(54) MOVEABLE MOUNTING SYSTEM

(75) Inventors: Donald Anderson, Oak Park, IL (US);
Garry Monaco, Hoffman Estates, IL (US); James Stemple, Marengo, IL (US)

(73) Assignee: Peerless Industries, Inc., Aurora, IL (US)

( * ) Notice: Subject to any disclaimer, the term of this patent is extended or adjusted under 35 U.S.C. 154(b) by 0 days.

(21) Appl. No.: 12/636,256

(22) Filed: Dec. 11, 2009

(65) Prior Publication Data

US 2010/0171013 A1    Jul. 8, 2010

Related U.S. Application Data

(60) Provisional application No. 61/142,553, filed on Jan. 5, 2009, provisional application No. 61/187,178, filed on Jun. 15, 2009.

(51) Int. Cl.
*E04G 3/00* (2006.01)

(52) U.S. Cl. ................... 248/282.1; 248/922

(58) Field of Classification Search ............ 248/282.1, 248/284.1, 289.11, 291.1, 292.11, 917, 919, 248/921, 922, 923; 361/679.01
See application file for complete search history.

(56) References Cited

U.S. PATENT DOCUMENTS

| | | | |
|---|---|---|---|
| 6,102,348 A * | 8/2000 | O'Neill | |
| 6,256,837 B1 * | 7/2001 | Lan et al. | |
| D488,708 S * | 4/2004 | Lam et al. | |
| D496,367 S * | 9/2004 | Pfister | |
| 6,886,701 B2 * | 5/2005 | Hong et al. | 211/99 |
| D505,858 S * | 6/2005 | O'Keene | |
| 6,905,101 B1 * | 6/2005 | Dittmer | |
| D507,477 S * | 7/2005 | Pfister | |
| 7,028,961 B1 * | 4/2006 | Dittmer et al. | |
| D530,595 S * | 10/2006 | Lam et al. | |
| 7,152,836 B2 * | 12/2006 | Pfister et al. | |
| 7,178,775 B2 * | 2/2007 | Pfister et al. | |
| D540,154 S * | 4/2007 | Bremmon | |
| D540,332 S * | 4/2007 | Dittmer et al. | |
| 7,243,892 B2 * | 7/2007 | Pfister | |
| D549,558 S * | 8/2007 | Dittmer et al. | |
| D556,205 S * | 11/2007 | Wohlford et al. | |

(Continued)

FOREIGN PATENT DOCUMENTS

DE    202006013179 U1    1/2007

(Continued)

OTHER PUBLICATIONS

U.S. Appl. No. 12/636,238, filed Dec. 11, 2009, Monaco.

(Continued)

*Primary Examiner* — Ramon O Ramirez
(74) *Attorney, Agent, or Firm* — Foley & Lardner LLP

(57) ABSTRACT

A low profile moveable mounting system for mounting a device to a surface. According to various embodiments, a surface bracket is operatively connected to a surface member attachable to a surface, one or more hinged translation assemblies are rotatably connected to the surface bracket and rotatably connected to a device bracket adapted for operative connection to a device, and a link member rotatably connected to the surface bracket and the device bracket. The moveable mounting system is selectively tiltable and moveable between an extended orientation, where the device bracket is displaced substantially perpendicular from the surface and a retracted orientation, where the device bracket is positionable proximate the surface. The moveable mounting system may be particularly adapted for mounting a flat panel display device.

27 Claims, 11 Drawing Sheets

U.S. PATENT DOCUMENTS

| | | | |
|---|---|---|---|
| D558,560 S * | 1/2008 | Ciungan | |
| D558,561 S * | 1/2008 | Ciungan | |
| D558,562 S * | 1/2008 | Ciungan | |
| D558,563 S * | 1/2008 | Ciungan | |
| D558,564 S * | 1/2008 | Ciungan | |
| D559,087 S * | 1/2008 | Ciungan | |
| D559,088 S * | 1/2008 | Ciungan | |
| D562,113 S * | 2/2008 | Ciungan et al. | |
| 7,380,760 B2 * | 6/2008 | Dittmer | |
| 7,387,286 B2 * | 6/2008 | Dittmer et al. | |
| 7,395,996 B2 * | 7/2008 | Dittmer | |
| 7,398,950 B2 * | 7/2008 | Hung | 248/276.1 |
| 7,438,269 B2 * | 10/2008 | Pfister et al. | |
| 7,448,584 B2 * | 11/2008 | Chen et al. | 248/278.1 |
| 7,487,943 B1 * | 2/2009 | Gillespie | |
| 7,513,469 B1 * | 4/2009 | Ciungan | |
| D593,080 S * | 5/2009 | Russell et al. | |
| D595,723 S * | 7/2009 | Bures et al. | |
| D596,189 S * | 7/2009 | Bures et al. | |
| D605,185 S * | 12/2009 | Russell et al. | |
| 7,641,163 B2 * | 1/2010 | O'Keene | |
| 2003/0154673 A1 | 8/2003 | MacGregor et al. | |
| 2004/0000031 A1 | 1/2004 | Hsu | |
| 2005/0152102 A1 | 7/2005 | Shin | |
| 2006/0231711 A1 * | 10/2006 | Shin | 248/291.1 |
| 2006/0284037 A1 | 12/2006 | Dittmer et al. | |
| 2007/0007412 A1 * | 1/2007 | Wang | 248/284.1 |
| 2007/0007413 A1 * | 1/2007 | Jung et al. | 248/284.1 |
| 2007/0023599 A1 * | 2/2007 | Fedewa | 248/284.1 |
| 2007/0194196 A1 | 8/2007 | Pfister et al. | |
| 2008/0035816 A1 | 2/2008 | Ciungan | |
| 2008/0105633 A1 | 5/2008 | Dozier et al. | |
| 2008/0237424 A1 | 10/2008 | Clary | |
| 2008/0258029 A1 | 10/2008 | Zhang | |
| 2009/0050763 A1 | 2/2009 | Dittmer | |
| 2009/0194655 A1 | 8/2009 | Huang | |
| 2009/0289159 A1 * | 11/2009 | O'Keene | |
| 2010/0149736 A1 * | 6/2010 | Dittmer et al. | 361/679.01 |
| 2010/0208418 A1 * | 8/2010 | Russell et al. | 361/679.01 |
| 2010/0219315 A1 * | 9/2010 | Muday et al. | 248/284.1 |

FOREIGN PATENT DOCUMENTS

| | | |
|---|---|---|
| DE | 202008001895 U1 | 7/2008 |
| DE | 202009000975 U1 | 5/2009 |
| EP | 1837583 A2 | 9/2007 |
| WO | WO2007/035770 A1 | 3/2007 |
| WO | WO2008/083396 A1 | 7/2008 |
| WO | WO2008/123852 A1 | 10/2008 |

OTHER PUBLICATIONS

U.S. Appl. No. 12/637,018, filed Dec. 14, 2009, Stemple.
U.S. Appl. No. 12/503,718, filed Jul. 15, 2009, O'Keene.
U.S. Appl. No. 11/528,200, filed Sep. 27, 2006, Walters.

* cited by examiner

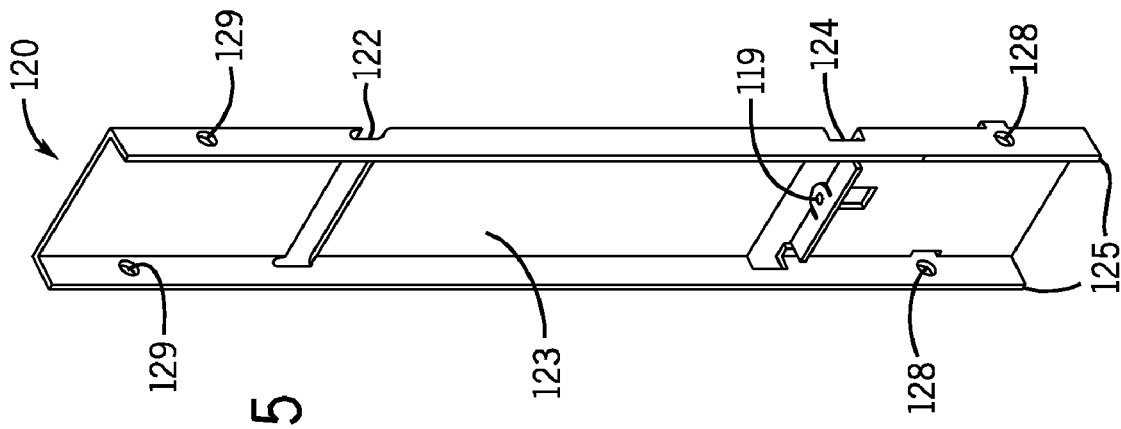
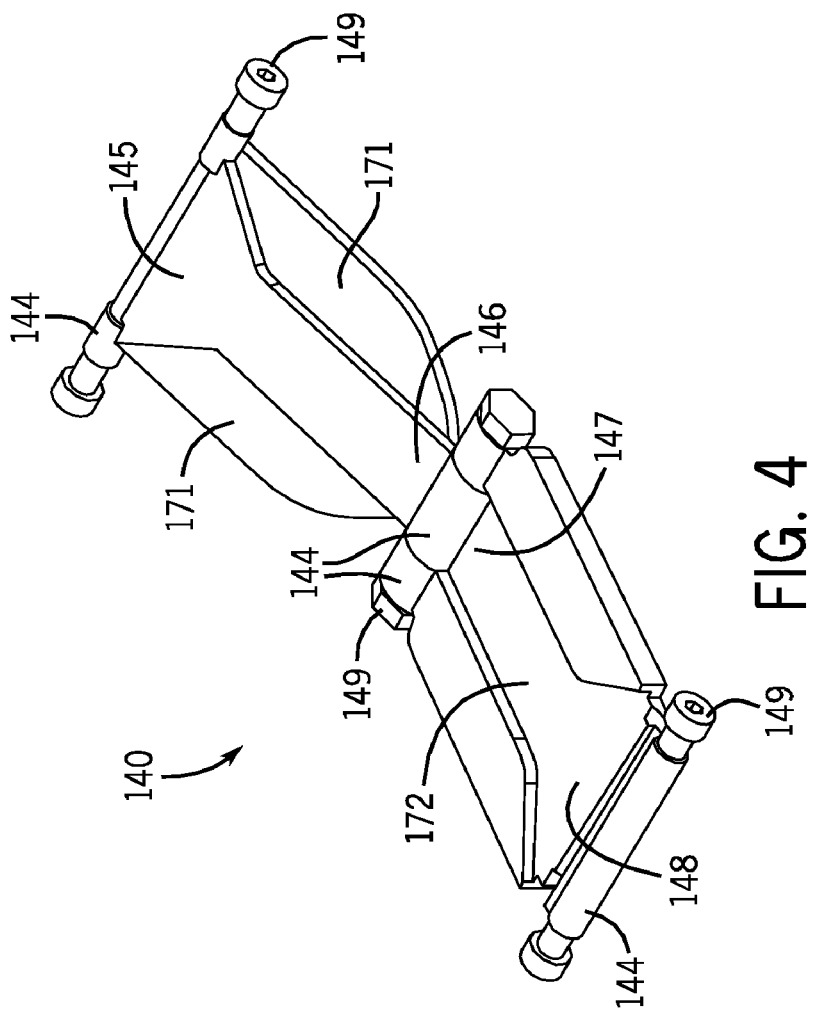

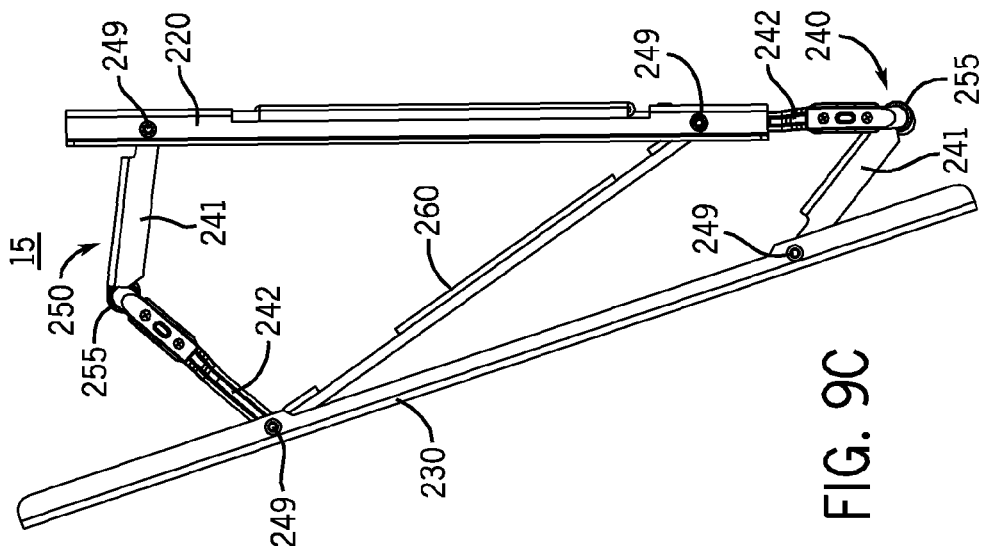
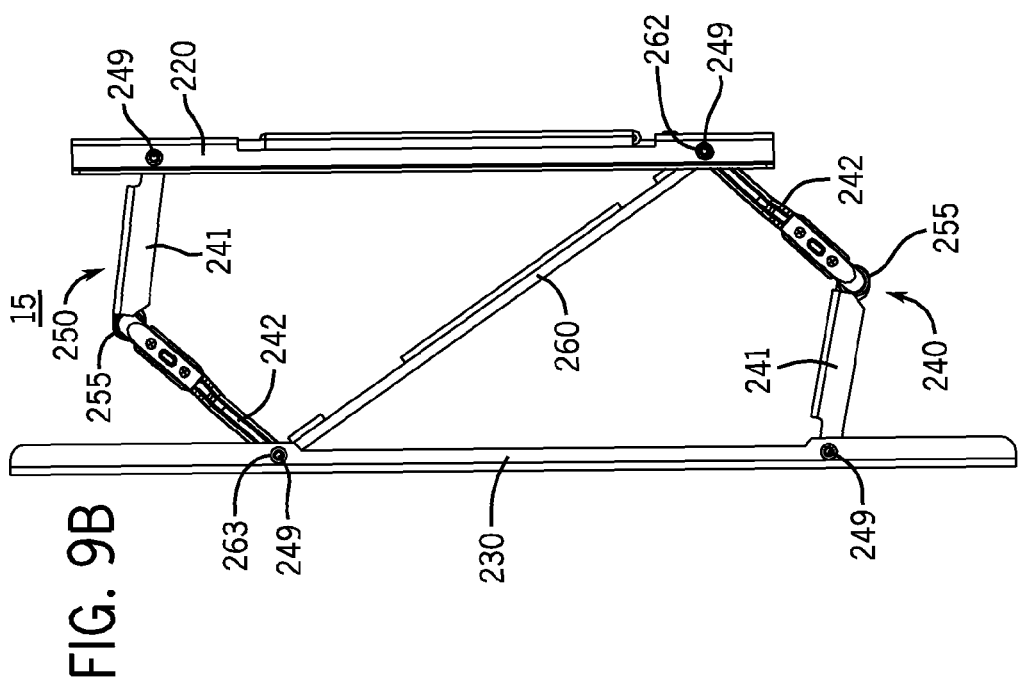
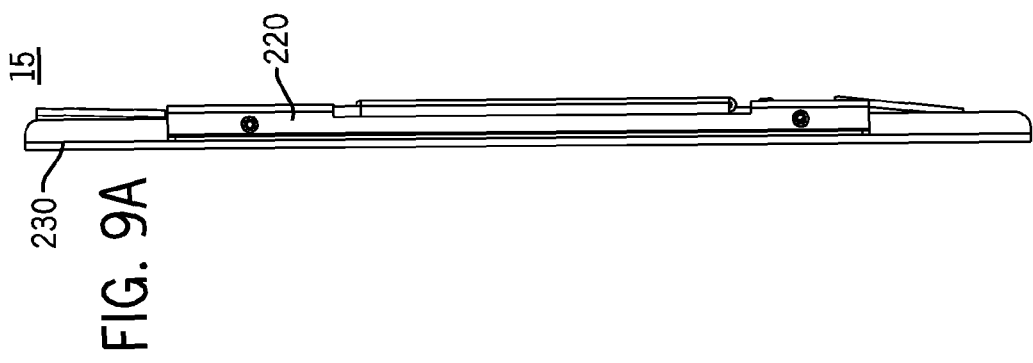

MOVEABLE MOUNTING SYSTEM

CROSS REFERENCE TO RELATED APPLICATIONS

The present application claims priority to U.S. Provisional Patent Application No. 61/142,553 filed Jan. 5, 2009 and U.S. Provisional Patent Application No. 61/187,178, filed Jun. 15, 2009. The contents of these applications are incorporated by reference herein.

FIELD OF THE INVENTION

The present invention relates generally to mounting systems. More particularly, the present invention relates to moveable mounting systems for flat panel televisions.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both commercial and residential sectors. As the prices for plasma and liquid crystal display (LCD) flat panel displays have continued to fall, and the quality for the same devices have improved, more and more businesses and individuals have purchased such devices for both home and business entertainment purposes.

One of the advantages of flat panel television units that customers have found particular appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However these systems usually require professional installation and, once the television is secured to the mount, it is often difficult to access and adjust due to its height. With flat panel televisions, on the other hand, users are presented with a relatively new option: mounting the television directly to the wall. By mounting the television to the wall, a person can eliminate the need to take up potentially valuable floor space.

Although the introduction of flat panel televisions on a wide scale has presented new opportunities to both residential and commercial customers, it has also presented new challenges. In particular, flat panel televisions, while usually having significantly smaller depth or profile than conventional "tube" televisions, tend to be quite heavy. Particularly for flat panel televisions with large screens, this weight can become prohibitively great. With such large weights involved, it is especially important that users can easily, safely, and securely mount the devices without having to make substantial adjustments. Furthermore, with such weights involved and the high cost of such devices, it is important that the device be mounted correctly on the first attempt: if the device is not correctly mounted on the first try, there is a high risk of damaging the device and causing injury to those installing it.

With the above considerations in mind, there have been various attempts to develop mounting systems that address these concerns. Besides the flat wall mounts, there have been mounts produced that provide for tilting capability. The tilting type mounts generally allow a flat panel to be tilted downward and/or upward to accommodate various viewing angles.

Flat panel televisions are ever increasing in size, and as they become less expensive, consumers are buying the largest they can afford. Flat panel televisions also conveniently provide twice the screen size of a "tube" unit, resulting in a more enjoyable viewing experience. Customers are trying to fit the largest flat panel television into limited space: such as just above a fire place mantel, or in a corner up against the ceiling. These examples require a specific fine tuning of the position of the television for the perfect installation effect, while still maintaining the display tilt feature.

SUMMARY OF THE INVENTION

Various embodiments of the present invention provide a moveable mounting system for use with a variety of devices, especially display devices such as flat screen televisions. When mounted to a substantially vertical mounting surface such as a wall, the moveable mounting system provides horizontal adjustment that allows the display device to be adjustably orientated in relation to the mounting surface, from a retracted position proximate the mounting surface to a fully extended position as well as any intermediate position therebetween. The moveable mounting system is configured to have a low profile such that the rear surface of the display device may be in close proximity to the mounting surface when the moveable mounting system is fully retracted, further enhancing the aesthetics of the flat panel display. The moveable mounting system also permits downward and upward tilting of the display device relative to the mounting surface to achieve various viewing angles.

In an embodiment, a moveable mounting system provides a surface member configured for attachment to the mounting surface. The moveable mounting system includes a first surface bracket operatively connected to the surface member and a second surface bracket operatively connected to the surface member. A device bracket is configured for attachment to a device. A first plurality of translation assemblies are rotatably connected to the first surface bracket and the device bracket. A second plurality of translation assemblies are rotatably connected to the second surface bracket and the device bracket. Each of the plurality of translation assemblies includes a surface member that is rotatably connected to a surface bracket. Each of the plurality of translation assemblies further includes a device member rotatably connected to the device bracket. A pivot portion rotatably connects the respective surface member and the device member. The moveable mounting system may also include a link member rotatably connected to the first surface bracket and the device bracket. The moveable mounting system is thus selectively moveable between an extended orientation, where the device bracket is disposed a distance along an axis substantially perpendicular from the surface member, and a retracted orientation, where the device bracket is disposed proximate the surface member. The moveable mounting system may be selectively moveable to any intermediate position between the extended and retracted orientations. Further, the moveable mounting system is selectively moveable between an orientation, where the device bracket is substantially coplanar with the surface member, and a downward tilt orientation, where the device bracket is rotated about a substantially horizontal axis. The substantially horizontal axis may be substantially parallel to the surface member in particular embodiments. In various embodiments, the pivot portion includes a friction hinge assembly capable of providing a resistance between rotation of the device member and the surface member.

These and other features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 4 is a perspective view of a translation assembly of the moveable mounting system of FIG. 1;

FIG. 5 is a perspective view of a surface bracket of the moveable mounting system of FIG. 1;

FIG. 9A is a side plan view of the moveable mounting system of FIG. 7A when in a retracted orientation, FIG. 9B is a side plan view of the moveable mounting system of FIG. 7B when in an extended orientation, and FIG. 9C is a side plan view of the moveable mounting system of 7A in a downward downward tilt orientation;

DETAILED DESCRIPTION OF VARIOUS EMBODIMENTS

Figure 1:
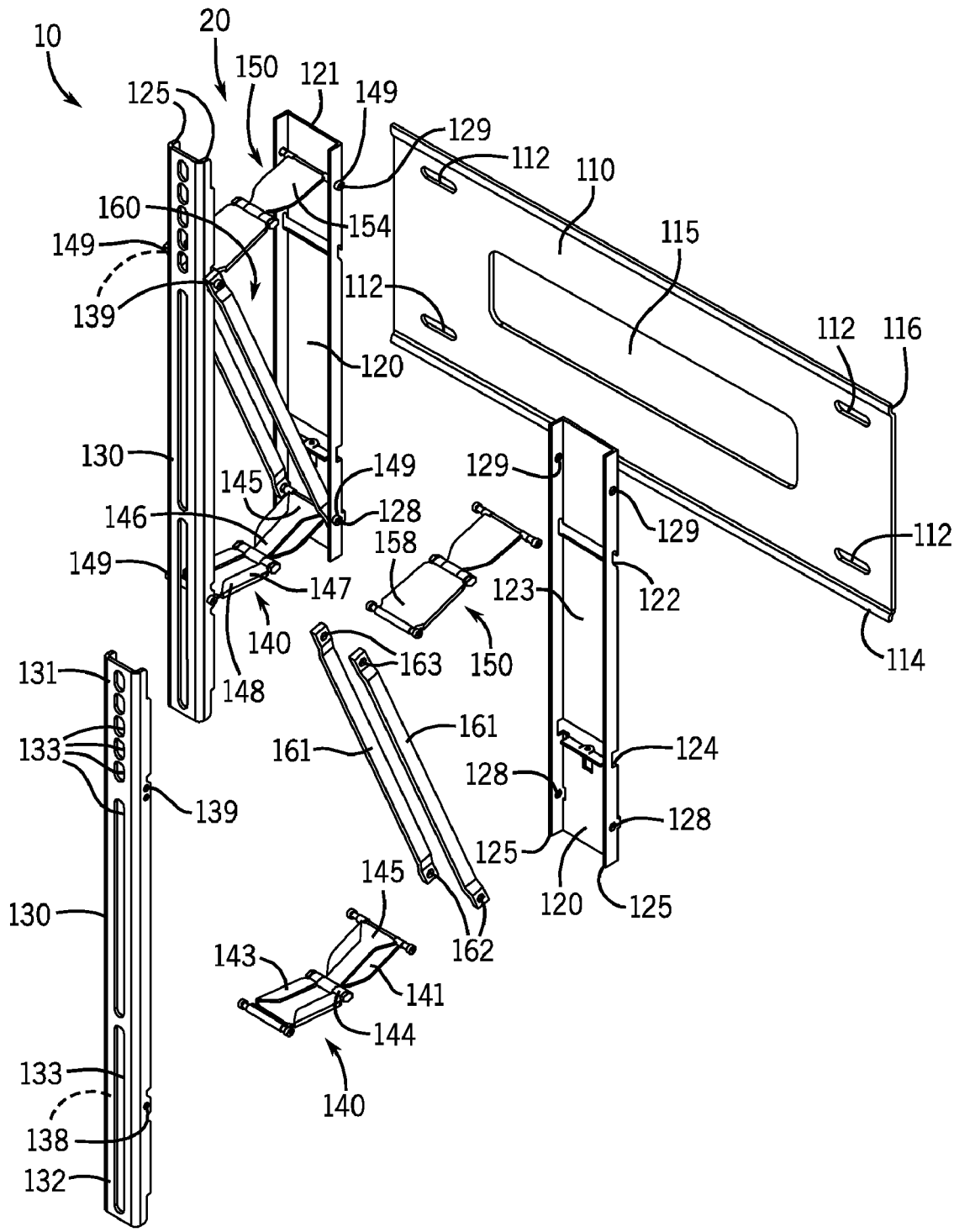
FIG. 1 is an exploded view of a moveable mounting system constructed in accordance with an embodiment of the present invention.

FIGS. 1-5 show a moveable mounting system 10 constructed in accordance with an embodiment of the present invention. The moveable mounting system 10 may comprise a surface mount 110 configured for attachment to a mounting surface, a surface bracket 120 operatively connected to the surface mount 110, a device bracket 130 attachable to a device, a lower translation assembly 140 and an upper translation assembly 150. The lower translation assembly 140 and the upper translation assembly 150 are both rotatably coupled to the surface bracket 120 and rotatably coupled to the device bracket 130. A link member assembly 160 is also rotatably coupled to the surface bracket 120 and the device bracket 130. In the depicted embodiment, the moveable mounting system 10 includes a plurality of mount assemblies 20 (two mount assemblies 20 in the disclosed embodiment) comprising the surface bracket 120, device bracket 130, lower and upper translation assemblies 140 and 150, and the link member assembly 160. The plurality of mount assemblies 20 are spaced apart from each other on the surface mount 110, and each mount assembly 20 distributes a portion of the weight of the attached device to the surface mount 110.

Figure 2B:
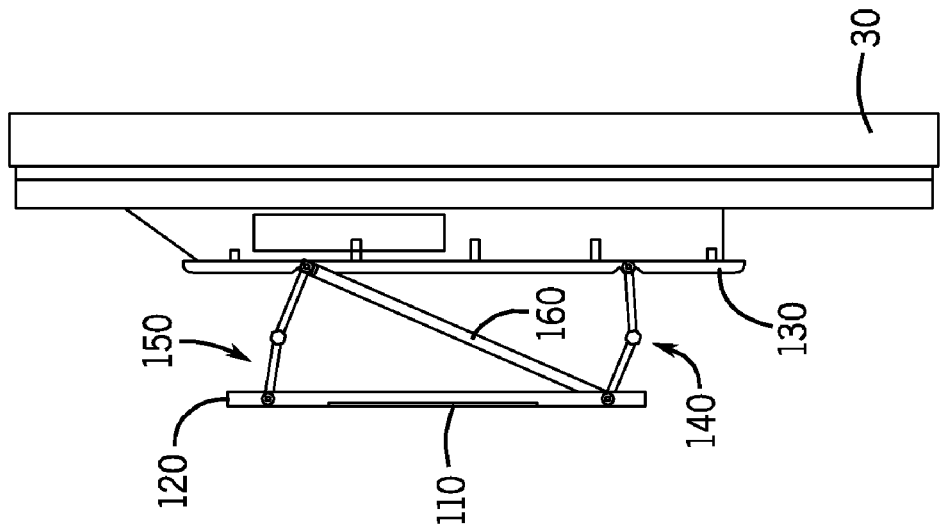
FIG. 2B is a side plan view of the moveable mounting system of FIG. 1 in an extended orientation with a flat panel display attached.
Figure 2A:
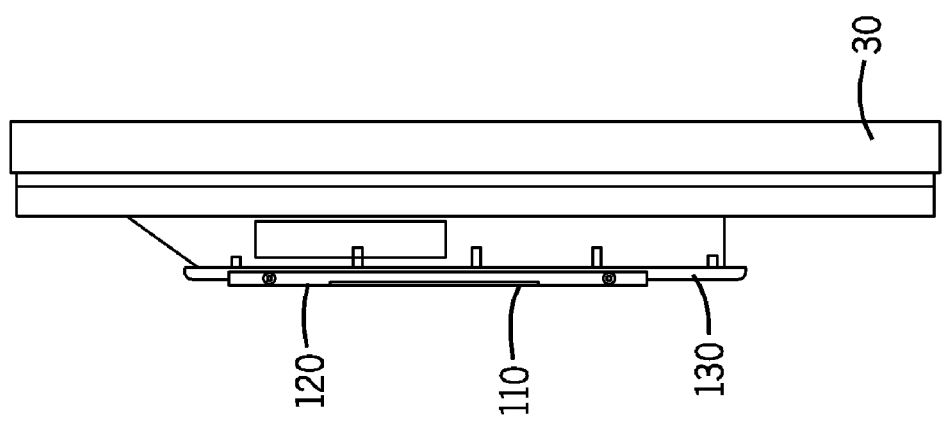
FIG. 2A is a side plan view of the moveable mounting system of FIG. 1 in a retracted orientation with a flat panel display attached.

As discussed in detail below, the above described features allow for a mounted device to be translated between a retracted orientation proximate the mounting surface and an extended orientation disposed away from the mounting surface. When the mounting surface is, for example, a substantially vertical wall, the mounted device translates along a substantially horizontal axis extending substantially perpendicular from the wall. Further, the attached device may be readily tilted upward about a substantially horizontal axis substantially parallel to the mounting surface by pulling a bottom portion of the device away from the mounting surface and tilted downward by pulling a top portion of the device away from the mounting surface. Alternatively, by changing the orientation of the moveable mounting system 10, the attached device may be rotated left to right about a substantially vertical axis. In particular embodiments, the moveable mounting system 10 may be configured to provide a low profile moveable mounting system for a flat panel display device 30, where the mounted device may be orientated in close proximity to the mounting surface when the moveable mounting system 10 is fully retracted, as shown in FIG. 2A.

As shown in FIG. 1, for example, the surface mount 110 may comprise one or more relatively thin plates that can be affixed to a wall or other desired mounting surface via a plurality of openings 112 for accepting bolts, screws, or other connecting elements. It should be noted that in various embodiments of the present invention, the plurality of openings 112 are substantially horizontally spaced openings commensurate with standard wall stud spacing. Additionally, in various embodiments, each of the plurality of openings 112 comprises a substantially horizontally elongated slot to allow for variations that can be experienced with the standard wall stud spacing. In other embodiments, the surface mount 110 may comprise one or brackets or other members.

The surface mount 110 further comprises engagement features for operative connection of the surface bracket 120. The surface bracket 120 may be attached to the surface mount 110 via, for example, a plurality of connecting elements such as screws or bolts, interconnecting engagement features, welded, or combinations thereof. In the depicted embodiment, the surface mount 110 includes a lower lip 114 disposed along a length of the lower periphery and an upper lip 116 disposed along a length of the upper periphery of the surface mount 110. The lower and upper lips 114 and 116 extend outwardly away from the face of the surface mount 110, presenting an engagement surface for adjustable attachment of the surface bracket 120 to the surface mount 110. The lower and upper lips 114 and 116 need not be disposed on the lower and upper periphery but may be otherwise disposed elsewhere on the surface mount 110. The moveable mounting system 10 is adaptable to various sizes and engagement configurations of the attached device by independently positioning one or more of the surface brackets 120 on the surface mount 110. Similarly, precise horizontal placement and adjustment of the attached device relative to the surface mount 110 is achievable even after installation of the moveable mounting system 10 is complete, simplifying installation of the moveable mounting system 10.

The surface mount 110 may further include one or more apertures or recesses to receive cables, wires or other implements connected to or extending from the rear of the attached device. As shown in FIG. 1, a central aperture 115 may be provided for this purpose. The central aperture 115 may be made relatively large to accommodate multiple cables and installation locations. When the central aperture 115 is relatively large, the mass of the moveable mounting system 10 is also reduced, improving the ease of installation without a substantial loss of strength or security of the moveable mounting system 10.

The surface bracket 120 is configured for operative connection to the surface mount 110. As shown in FIG. 1, the surface mount 110 may include a lower lip 114 and an upper lip 116 configured to couple with the surface bracket 120. As shown in FIG. 5, the surface bracket 120 may include corresponding engagement features on a surface face 121 such as an upper slot 122 and a lower slot 124 to couple with the lower and upper lips 114 and 116, respectively. The lower and upper slots 122 and 124 may be configured to permit the surface bracket 120 to be slid along a length of the surface mount 110. The surface bracket 120 may also include a security feature 119 to lock the position of the surface bracket 120 relative to the surface mount 110. The security feature 119 may comprise an opening adapted to receive a connecting element engageable with, for example, the lower lip 114. Operative connection of the surface bracket 120 to the surface mount 110 is not limited to the depicted configuration. Other features may be used in conjunction with or in alternative to the lower and upper slots 122 and 124. For example, one or more hooks, dovetail assemblies, connecting elements, or others features and combinations thereof may be implemented. Further, the surface bracket 120 may also be disposed in a substantially horizontal orientation. Still further, the moveable mounting system 10 may include one or more of the surface brackets 120 operatively coupled to the surface mount 110 to accommodate devices of various dimensions and mass. The moveable mounting system 10 may also be configured for use without the surface mount 110 where the surface bracket 120 is attachable to the mounting surface.

The lower and upper translation assemblies 140 and 150 are rotatably coupled to the surface bracket 120 and extend from a device face 123, opposite the mounting surface, of the surface bracket 120. The link member assembly 160 is also rotatably coupled to the surface bracket 120 and likewise extends from the device face 123. The surface bracket 120 may be provided with a plurality of positions for rotatably coupling the lower and upper translation assemblies 140 and 150 and the link member assembly 160. For example, opposing sides 125 extending substantially normal from the device face 123 may be formed by bending outwardly a portion of the periphery of the surface bracket 120. The opposing sides 125 may include a plurality of openings configured to pivotally couple the lower and upper translation assemblies 140 and 150 and the link member assembly 160. The opposing sides 125 may run substantially the length of the surface bracket 120, providing additional rigidity to the surface bracket 120. However, the opposing sides 125 may run along a portion of the length of the surface bracket 120 and may also be intermittent along the length. Further, the surface bracket 120 may be constructed without sides and may rely on other features for rotational coupling to the other features of the moveable mounting system 10. Further still, the lower and upper translation assemblies 140 and 150 may be configured for connection to the surface mount 110 without use of the surface bracket 120.

As shown in FIGS. 1 and 5, each of the plurality of openings may be adapted to receive a portion of an axle 149 to rotatably couple the lower translation assembly 140, the upper translation assemblies 150, or the link member assembly 160. The surface bracket 120 includes a surface bracket lower opening 128 disposed on a lower portion of the surface bracket 120 and a surface bracket upper opening 129 disposed on an upper portion of the surface bracket 120. The lower translation assembly 140 and the link member assembly 160 are rotatably coupled to the surface bracket 120 at the surface bracket lower opening 128. The upper translation assembly 150 is rotatably connected to the surface bracket 120 at the surface bracket upper opening 129. Alternatively, the link member assembly 160 may be rotatably coupled to the surface bracket 120 at the surface bracket upper opening 129, in which case the link member assembly 160 may also be rotatably coupled towards the lower portion of the device bracket 130. Still further, the link member assembly 160 may be rotatably coupled to the surface bracket 120 at a third opening (not shown).

Figure 3B:
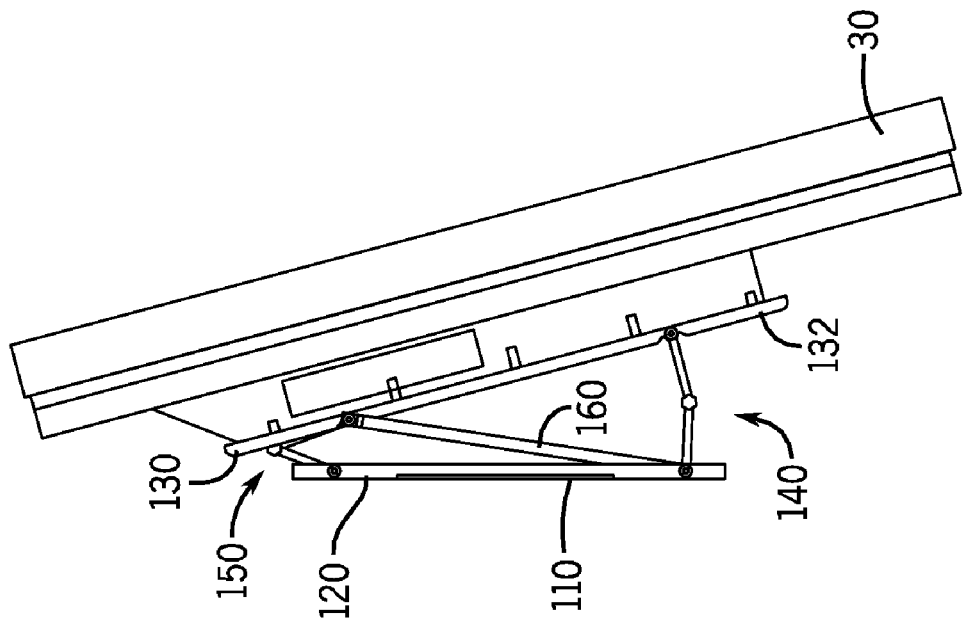
FIG. 3B is a side plan view of the moveable mounting system of FIG. 1 in an upward tilt orientation with a flat panel display attached.
Figure 3A:
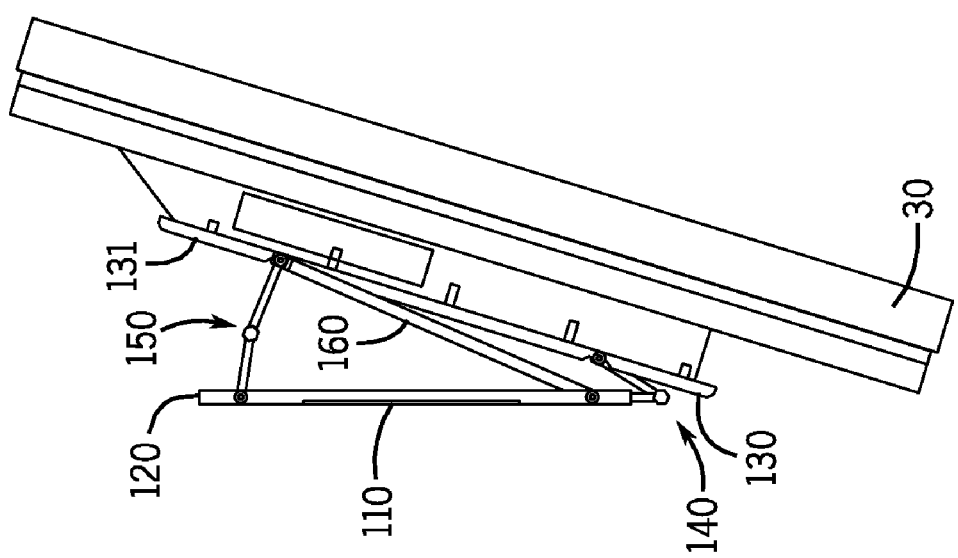
FIG. 3A is a side plan view of the moveable mounting system of FIG. 1 in a downward tilt orientation with a flat panel display attached.

The lower and upper translation assemblies 140 and 150 operatively connect the surface bracket 120 with the device bracket 130 and permit the device bracket 130 to translate between a retracted orientation proximate the surface bracket 120 and an extended orientation spaced apart from the surface bracket 120. When the surface bracket 120 is attached to a substantially vertical surface such as a wall, the device bracket translates along a substantially horizontal axis extending substantially perpendicular from the wall. Each of the lower and upper translation assemblies 140 and 150 include a medial pivot portion that allows the lower and upper translation assemblies 140 and 150 to pivotally open and fold. As depicted in FIG. 2B, the device bracket 130 translates away in a substantially normal direction from the mounting surface when the lower and upper translation assemblies 140 and 150 are simultaneously extended. FIG. 3A shows how the device bracket 130 may be pivoted downward about a substantially horizontal axis, providing a downward tilt, by orientating an upper portion 131 of the device bracket away from the surface, thereby extending the upper translation assembly 150 to a greater degree than the lower translation assembly 140. In FIG. 3B, the device bracket 130 is tilted upward about a substantially horizontal axis, providing an upward tilt, by orientating a lower portion 132 of the device bracket away from the surface. This extends the lower translation assembly 140 to a greater degree than the upper translation assembly 150. The moveable mounting system 10 may be constructed to include only a lower translation assembly 140 or only an upper translation assembly 150. In such configurations, the moveable mounting system 10 may be limited to tilting in one orientation, for example, downward tilt. Still further, the moveable mounting system 10 may be constructed with additional translation assemblies, including a medial translation assembly (not shown).

The lower and upper translation assemblies 140 and 150 may be substantially identical in their construction, although their construction may also differ. FIG. 4, shows a detailed view of the lower translation assembly 140. The lower translation assembly 140 comprises a surface member 141 rotatably coupled to a device member 143. The surface member 141 is configured for rotatable connection at a lower first end 145 to the surface bracket 120 at one of the plurality of openings, for example, the surface bracket lower opening 128, as depicted in FIG. 1. The device member 143 is configured for rotatable connection at a lower second end 148 to the device bracket 130 at device bracket lower openings 138. Similarly, the upper translation assembly 150 comprises a surface member 141 configured for rotational connection at an upper first end 154 to the surface bracket 120 at the surface bracket upper openings 129. The device member 143 of the upper translation assembly is rotatably coupled to the surface member 141. The device member 143 is also configured at an upper second end 158 for rotatable connection to the device bracket 130 at device member upper openings 139. Alternatively, the moveable mounting system 10 may be constructed without the surface bracket 120 where the lower and upper translation assemblies 140 and 150 are configured to directly or operatively connect to the surface mount 110.

As shown in FIG. 4, the surface member 141 includes a pivot portion 144 at the lower first end 145 and at a third end 146 distal from the lower first end 145. Similarly, the device member 143 includes a pivot portion 144 at a fourth end 147 and at the lower second end 148 distal from the fourth end 147. The pivot portions 144 may include a hollow portion configured to accept a portion of the axle 149 to rotatably connect to the adjacent member. For example, the pivot portion 144 of the third end 146 and the pivot portion 144 of the fourth end 147 are substantially coaxially aligned and rotatable about the axle 149, allowing the lower device assembly 140 to open and fold during operation of the moveable mounting system 10. The pivot portion 144 at the lower first end 145 is substantially aligned with the surface bracket lower opening 128 and rotatable about the axle 149. Alternatively, one or more of the pivot portions 144 may include a portion of a shaft that is receivable by adjacent pivot portion 144 or by one of the plurality of openings. The upper translation assembly 150 may be of similar construction as the lower translation member with corresponding surface member 141 rotatably connected to the device member 143. In the case of the upper translation assembly 150, the pivot portion 144 at the upper first end 154 is substantially aligned with the surface bracket upper opening 129 and rotatable about the axle 149.

The surface member 141 and the device member 143 may be constructed of rods, bars or similar members. As shown in FIG. 4, the surface member 141 and the device member 143 comprise a plurality of plates. The surface member 141 and the device member may be configured to partially nest when the moveable mounting system 10 is in a substantially closed orientation and the lower and upper translation assemblies 140 and 150 are at least partially folded. For example, the surface member 141 may include peripheral reliefs 171 and the device member may include a central relief 172 as shown in the depicted embodiment. This arrangement may be reversed, and other arrangements may of course be implemented to provide a degree of nesting of the surface member 141 and the device member 143. Accordingly, a relatively thin profile may be achieved for the moveable mounting system 10 when it is in a fully retracted orientation as depicted in FIG. 2A.

The device bracket 130 is configured for attachment to a device, such as the flat panel display device 30 depicted in FIGS. 2A-2B and 3A-3B. The device bracket 130 may include a plurality of attachment openings 133 to receive one or more connecting elements such as a bolt or screw to attach the device bracket to the flat panel display device 30 or other device. The flat panel display device 30 can be oriented in either a portrait or landscape orientation using the device bracket 130. The plurality of attachment openings 133 may comprise substantially vertically slots in an embodiment to provide attachment points for a variety of devices.

As described and depicted in FIG. 1, the device bracket 130 is rotatably coupled to the surface bracket 120 via the lower and upper translation assemblies 140 and 150. The device bracket 130 may be constructed similarly to the surface bracket 120. For example, opposing sides 125 extending substantially normal from the face of the device bracket 130 may be formed by bending a portion of the periphery of the device bracket 130 outwardly. The opposing sides 125 include a plurality of openings configured to pivotally couple the lower and upper translation assemblies 140 and 150 and the link member assembly 160. The opposing sides 125 may run substantially the length of the device bracket 130, providing additional rigidity to the device bracket 130. However, the opposing sides 125 may run along only a portion of the length of the device bracket 130 and may also be intermittent along the length. Further, the device bracket 130 may be constructed without sides and may rely on other features for rotational coupling to the other features of the moveable mounting system 10. Alternatively, the device bracket 130 may comprise a plate adapted for attachment to a device such as a flat panel display device 30.

As shown in FIG. 1, the device bracket 130 includes the device bracket lower openings 138 disposed proximate the lower portion 132 of the device bracket 130 and the device bracket upper openings 139 disposed proximate the upper portion 131 of the device bracket 130. The lower translation assembly 140 is rotatably coupled to the device bracket 130 at the device bracket lower openings 138. The upper translation assembly 150 and the link member assembly 160 are rotatably connected to the device bracket 130 at the device bracket upper openings 139. Alternatively, the link member assembly 160 may be rotatably coupled to the device bracket 130 at the device bracket lower openings 138. Still further the link member assembly 160 may be rotatably coupled to the device bracket 130 at a third opening (not shown).

The moveable mounting system 10 may include one or more device brackets 130. As shown in the depicted embodiment, the moveable mounting system 10 includes two of the device brackets 130 horizontally spaced apart. In this configuration, each of the device brackets 130 is substantially aligned with corresponding opposing surface brackets 120. The device bracket 130 and opposing surface bracket 120 may be configured such that brackets are at least partially nestable with each other when the moveable mounting system is in a retracted orientation. For example, as shown in FIGS. 1 and 2A, the surface bracket 120 is wider than the device bracket 130 and the device bracket 130 is partially nestable within the surface bracket 120 when the moveable mounting system 10 is in the retracted orientation. Further, as described, each of the lower and upper translation assemblies 140 and 150 are partially nestable themselves and may also nest within the partially nested surface bracket 120 and the device bracket 130. The moveable mounting system 10 may accordingly achieve a relatively low profile when fully retracted. In other words, a rear surface of a mounted display device 30 may be placed in close proximity to the mounting surface in the fully retracted orientation as depicted in FIG. 2A. Other configurations may also be constructed, for example, the nesting configuration between the surface bracket 120 and the device bracket 130 may be reversed. Additionally, the device bracket 130 and/or the surface bracket 120 may be orientated horizontally. Still further, the moveable mounting system 10 may comprise a plurality or a single device bracket 130 and a single or a plurality of surface bracket 120 to accommodate devices of a variety of dimensions and mass.

Figure 6:
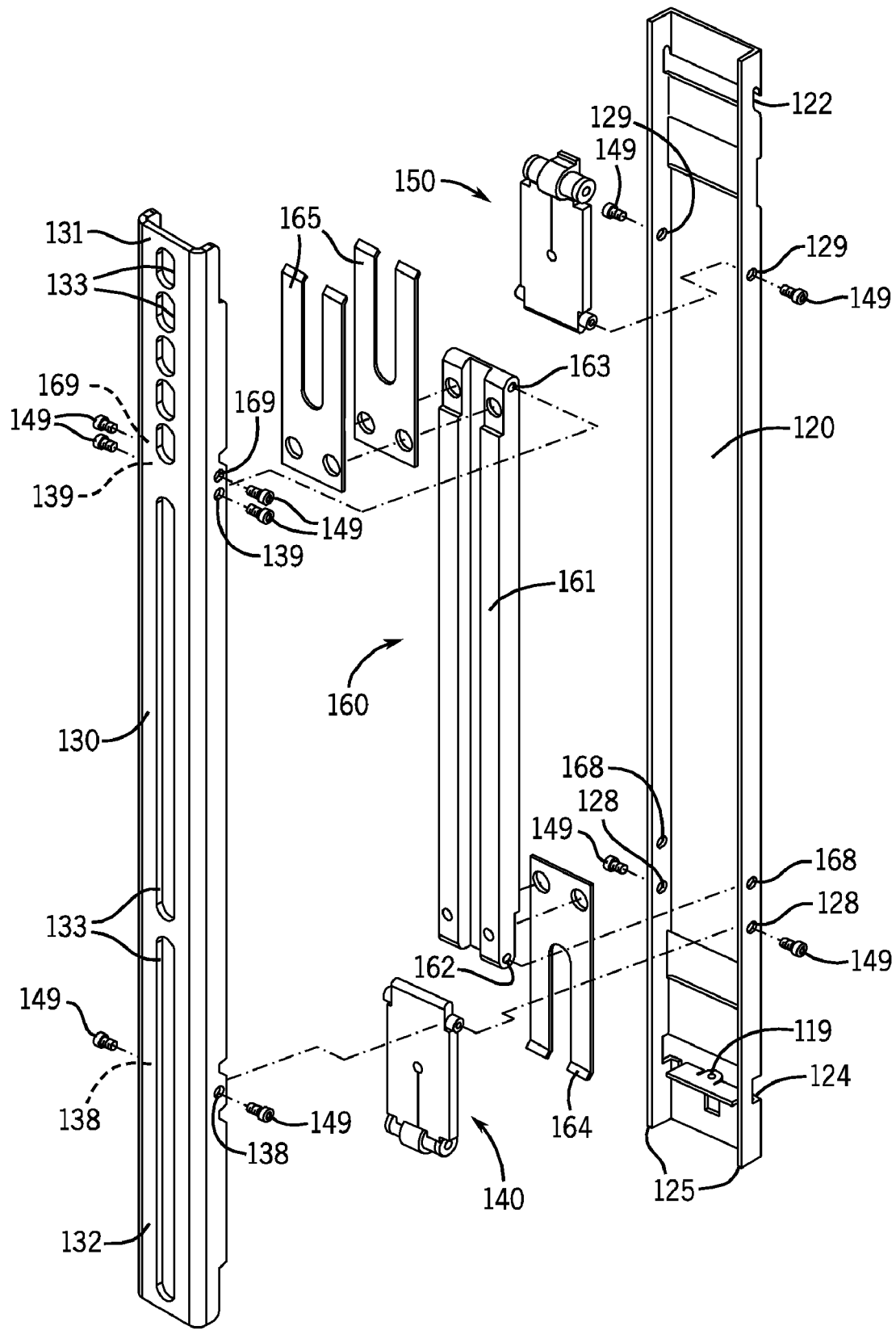
FIG. 6 is an exploded view of a portion of a moveable mounting system constructed in accordance with another embodiment of the present invention.

As shown in FIGS. 1 and 6, the link member assembly 160 may comprise one or more link members 161. Each of the link members 161 includes a first connection 162 and a second connection 163 distal the first connection 162. The first connection 162 rotatably connects to the surface bracket 120 and the second connection 163 rotatably connects to the device bracket 130. As shown in FIG. 1, the first connection 162 may be coaxial with the surface bracket lower opening 128 on the surface bracket 120 and the second connection 163 may be coaxial with the device bracket upper opening 139 on the device bracket. Each of the link members 161 may be configured to at least partially nest within the surface bracket 120 and the device bracket 130 when the moveable mounting system 10 is in a retracted orientation. The link member assembly 160 provides additional support for the moveable mounting system 10 in the extended and partially extended orientations, substantially maintaining the vertical position of the attached device.

As shown in FIG. 6, the link member assembly 160 may also comprise one or more lower biasing members 164 and one or more upper biasing members 165 operatively connected to the link member 161. As in the embodiment depicted in FIGS. 1-5, the link member 161 includes a first connection 162 and a second connection 163 distal the first connection 162. The first connection 162 rotatably connects to the surface bracket 120 and the second connection 163 rotatably connects to the device bracket 130. As depicted in FIG. 6, the first connection 162 may be coaxial with a link member lower opening 168 on the surface bracket 120 and the second connection 163 may be coaxial with a link member upper opening 169 on the device bracket. The rotatably connection of the link member assembly 160 may be reversed relative to the lower and upper openings of the surface bracket 120 and the device bracket 130. The link member assembly 160 may also comprise a plurality of link members 161, similar to the embodiment depicted in FIGS. 1-5. The link member assembly 160 may be configured to nest within the surface bracket 120 and the device bracket 130 when the moveable mounting system 10 is in a retracted orientation. When the moveable mounting system 10 is tilted or extended away from the mounting surface, the link member 161 rotates about an axis defined by the link member lower opening 168.

Each of the one or more lower and upper biasing members 164 and 165 are operatively connected to the link member 161 and engageable with the surface bracket 120 and/or device bracket 130. As shown in FIG. 6, one or more lower biasing members 164 are attached via connecting members (not shown) to the link member 161 proximate the first connection 162. One or more upper biasing members 165 are attached via connecting members (not shown) to the link member 161 proximate the second connection 163. Various configurations of the moveable mounting system 10 may be constructed using different combinations of or eliminating one or more of the lower and upper biasing members 164 and 165. Further, the placement and operative connection of one or more lower and upper biasing members 164 and 165 in relation to the link member 161 is not limited to the depicted configuration.

As shown in FIG. 6, the one or more lower and upper biasing members 164 and 165 may comprise relatively thin plates. In a particular embodiment, the one or more lower and upper biasing members 164 and 165 are constructed of spring steel. However, other embodiments may be constructed where the one or more lower and upper biasing members 164 and 165 may comprise, various spring elements, elastically deformable materials such as polymer or rubber, and combinations thereof. The one or more lower biasing members 164 are operatively connected to the link member 161 such that when the moveable mounting system 10 is extended or tilted, the one or more lower biasing members 164 generate resistance to further tilting or extension to, for example, effectively counterbalancing the mass of the attached device. Similarly, the one or more upper biasing members 165 generate resistance to further tilting or extension.

In an embodiment of the present invention, the moveable mounting system 10 is configured to support a flat panel display device 30. However, other types of devices could also be mounted on the moveable mounting system 10. As depicted, the weight of the flat panel display device 30 is distributed between the plurality of mount assemblies 20. As shown in FIG. 2B, the flat panel display device 30 may be extended away from the mounting surface by grasping the lower and upper portion of flat panel display device 30 and pulling outward away from the surface, thereby extending the plurality of mount assemblies 20. Likewise, as seen in FIG. 2A, pushing the flat panel display device 30 toward the surface retracts the plurality of mount assemblies 20, folding the lower and upper translation assemblies 140 and 150 and nesting them within the surface bracket 120 and the device bracket 130. The flat panel display may thus be positioned in close proximity to the mounting surface. The flat panel display device 30 may be tilted downward as shown in FIG. 3A about a substantially horizontal axis when mounted to a substantially horizontal surface by grasping the flat panel display near the top and pulling outward away from the surface. The flat panel display device 30 may also be tilted upward, as shown in FIG. 3B, about a substantially horizontal axis by grasping the flat panel display near the bottom and pulling outward away from the surface. The above adjustments can accommodate a variety of viewing locations and viewing angles. In an embodiment, the flat panel display device 30 may tilted downward from a orientation substantially coplanar with the mounting surface as much as 30 degrees and upward as much as 30 degrees.

Figure 7A:
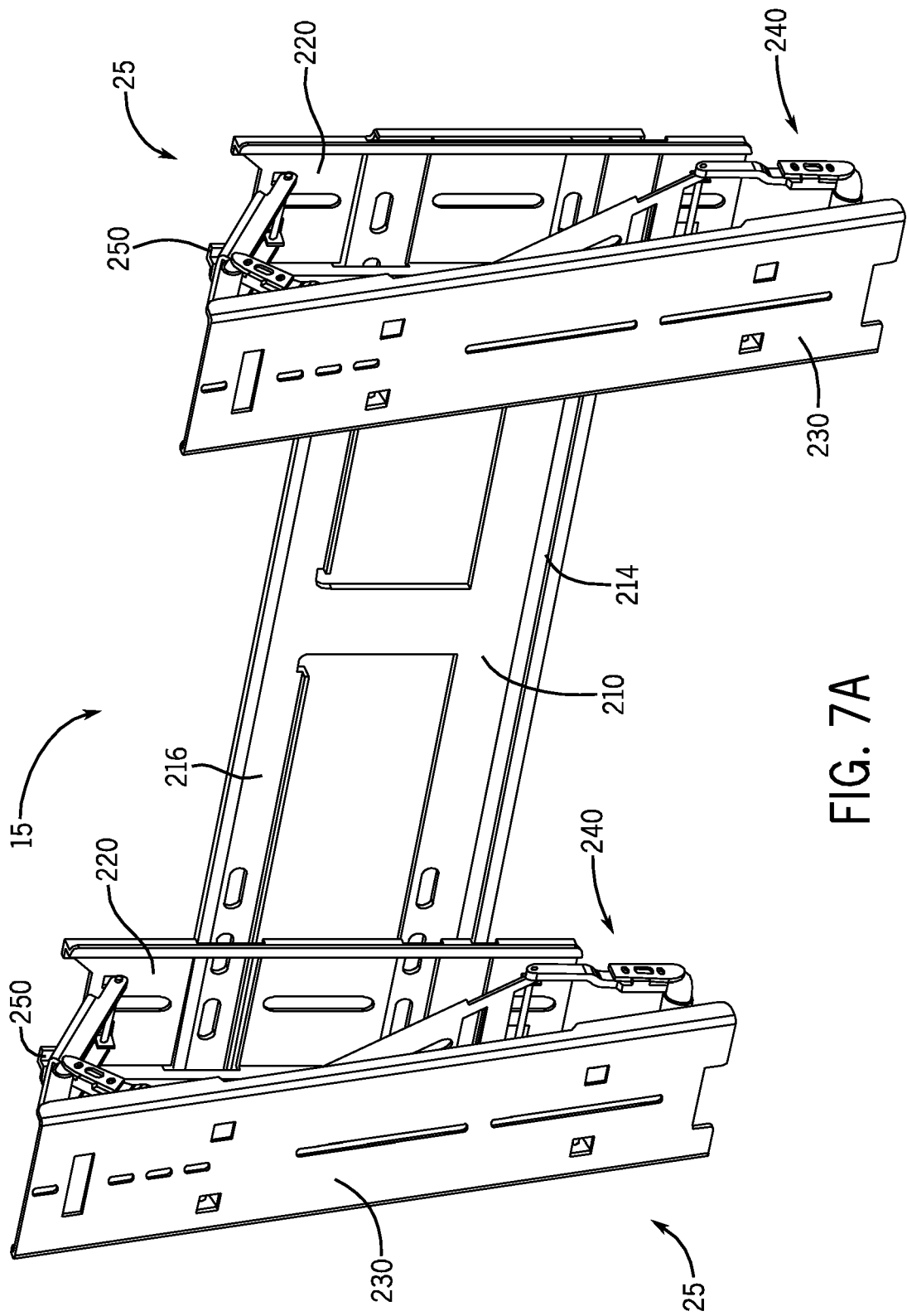
FIG. 7A is a perspective view of a moveable mounting system constructed in accordance with another embodiment of the present invention shown in an extended orientation.

FIGS. 7A-12 show a moveable mounting system 15 constructed in accordance with another embodiment of the present invention. The moveable mounting system 15 includes one or mount assemblies 25 attachable to a device. The one or more mount assemblies 25 may be attached to a mounting surface (not shown) or coupled to a surface mount 210 attachable to a mounting surface. Each of the one or more mount assemblies 25 comprise a surface or bracket 220, a device bracket 230 configured for attachment to a device, a lower translation assembly 240 and an upper translation assembly 250. The lower translation assembly 240 and the upper translation assembly 250 are each rotatably coupled to the surface bracket 220 and rotatably coupled to the device bracket 230. A link member assembly 260 may also be rotatably coupled to the surface bracket 220 and the device bracket 230. The moveable mounting system 15 may include a pair of the one or more mount assemblies 25 as depicted in FIGS. 7A and 7B.

As shown in FIGS. 9A and 9B, the mounting system 15 provides for translation of a the device bracket 230 (and attached device, not shown) between a retracted orientation proximate the surface bracket 220 (and mounting surface, not shown) and an extended orientation where the device bracket 230 is disposed a distance from the surface bracket 220. When the mounting surface is, for example, a substantially vertical wall, the device bracket 230 may translate along a substantially horizontal plane extending perpendicular from the surface bracket 220. Further, the device bracket 230 may be tilted "downward" (FIG. 9C) to a tilt angle by pulling a top portion of the device bracket 230 (or attached device) away from the surface bracket 220. The device bracket 230 may be returned to the position of FIG. 9A by pushing on the top portion of the device bracket. The device bracket 230 may be selectively located at any intermediate tilt angle between a fully tilted orientation and a fully retracted orientation. In an embodiment, the device bracket 230 may also be tilted "upward" by pulling a bottom portion of the device bracket 230 (or attached device) away from the surface bracket 220. Alternatively, by changing the orientation of the moveable mounting system 20, the attached device may be rotated left to right about a substantially vertical plane by pulling on the left or right portion of the device bracket 230 or attached device, respectively.

In various embodiments, the moveable mounting system 15 may be configured to provide a low profile moveable mounting system for a flat panel display device 30, where the mounted device may be orientated in close proximity to the mounting surface when the moveable mounting system 15 is fully retracted, as shown in FIG. 9A. As shown in FIG. 7A, for example, the surface mount 210 may comprise one or more relatively thin plates that can be affixed to a wall or other desired mounting surface via a plurality of openings 212 for accepting bolts, screws, or other connecting elements. It should be noted that in various embodiments of the present invention, the plurality of openings 212 are substantially horizontally spaced openings commensurate with standard wall stud spacing. Additionally, in various embodiments, each of the plurality of openings 212 comprises a substantially horizontally elongated slot to allow for variations that can be experienced with the standard wall stud spacing. In other embodiments, the surface mount 210 may comprise one or brackets or other members.

The surface mount 210 further comprises engagement features to facilitate operative connection of the surface bracket 220. The surface bracket 220 may be attached to the surface mount 210 via, for example, a plurality of connecting elements such as screws or bolts, interconnecting engagement features, welded, or combinations thereof. In the depicted embodiment, the surface mount 210 includes a lower lip 214 disposed along a length of the lower periphery and an upper lip 216 disposed along a length of the upper periphery of the surface mount 210. The lower and upper lips 214 and 216 extend outwardly away from the face of the surface mount 210, presenting an engagement surface for adjustable attachment of the surface bracket 220 to the surface mount 210. The lower and upper lips 214 and 216 need not be disposed on the lower and upper periphery but may be otherwise disposed elsewhere on the surface mount 210. The moveable mounting system 15 is adaptable to various sizes and engagement configurations for the attached device by independently positioning one or more of the surface brackets 220 on the surface mount 210. Similarly, precise horizontal placement and adjustment of the attached device relative to the surface mount 210 is achievable even after installation of the moveable mounting system 15 is complete, simplifying installation of the moveable mounting system 20.

Figure 8A:
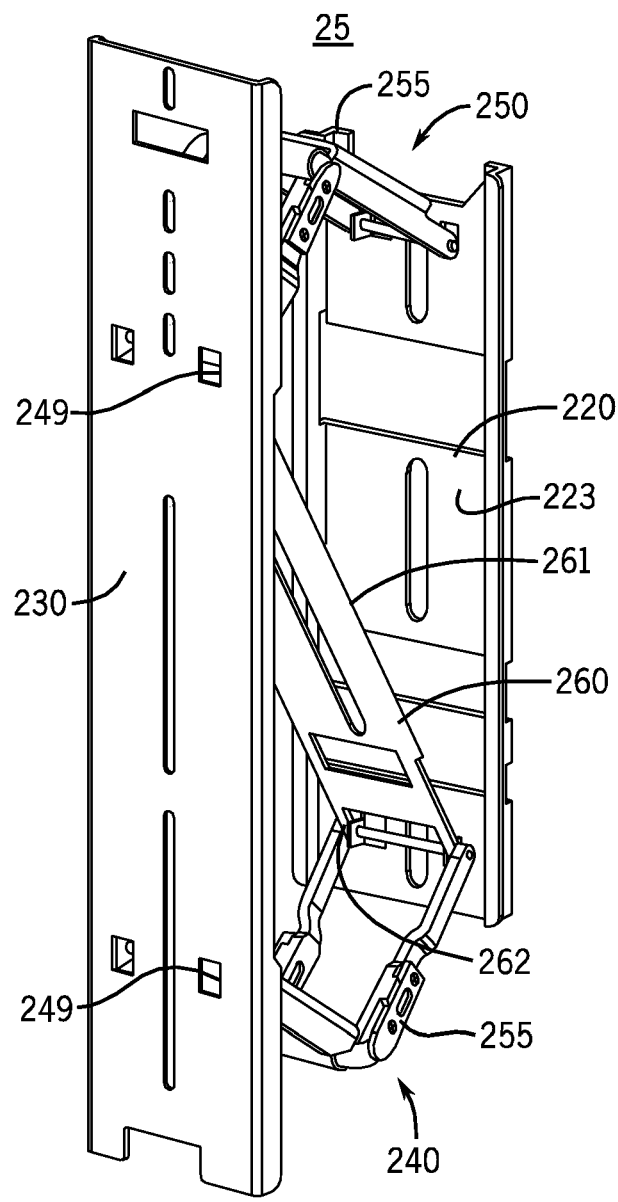
FIG. 8A is a perspective view of a mounting assembly of the moveable mounting system of FIG. 7A.
Figure 10:
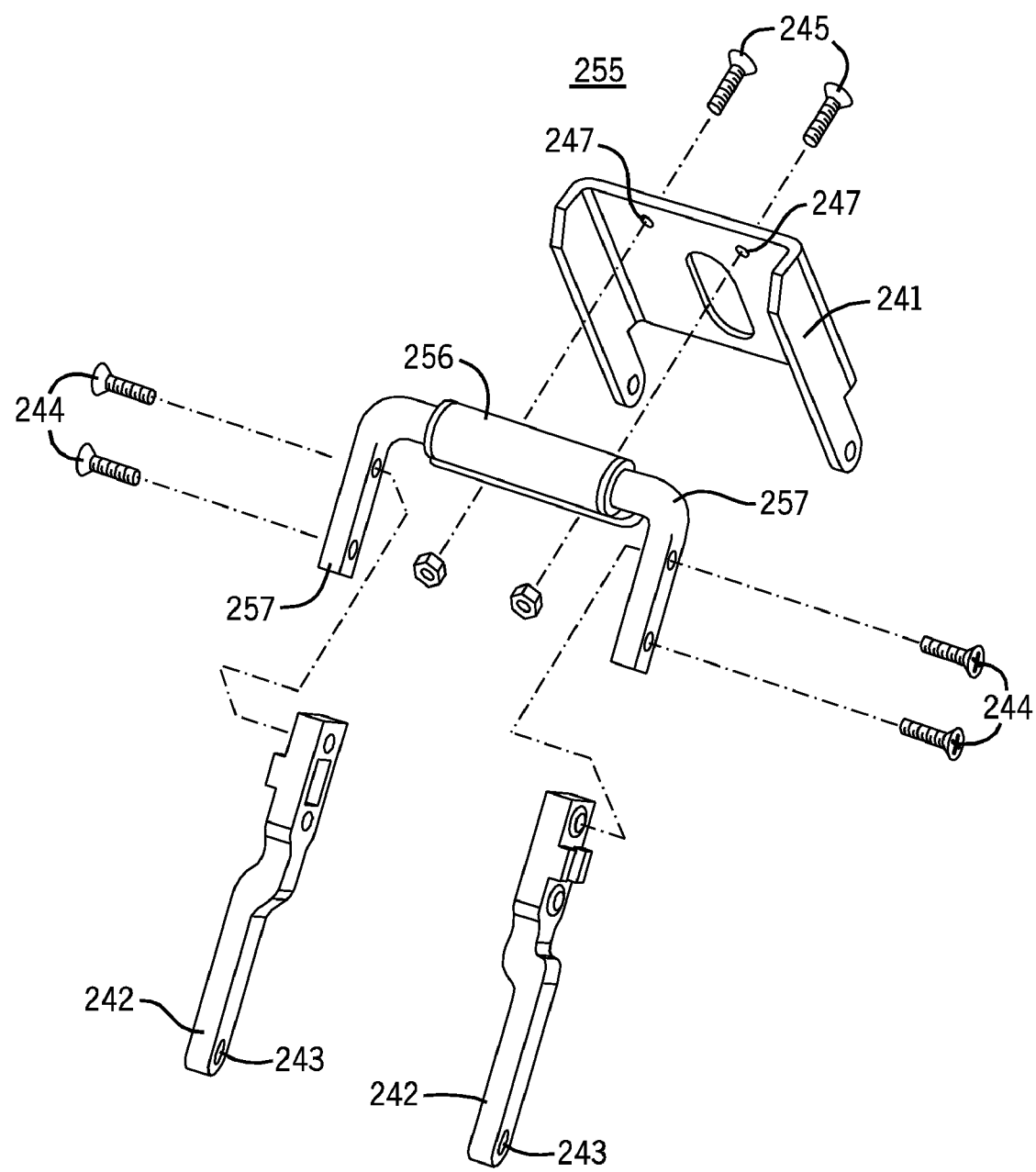
FIG. 10 is an exploded view of a hinge assembly of the moveable mounting system of FIG. 7A.
Figure 12:
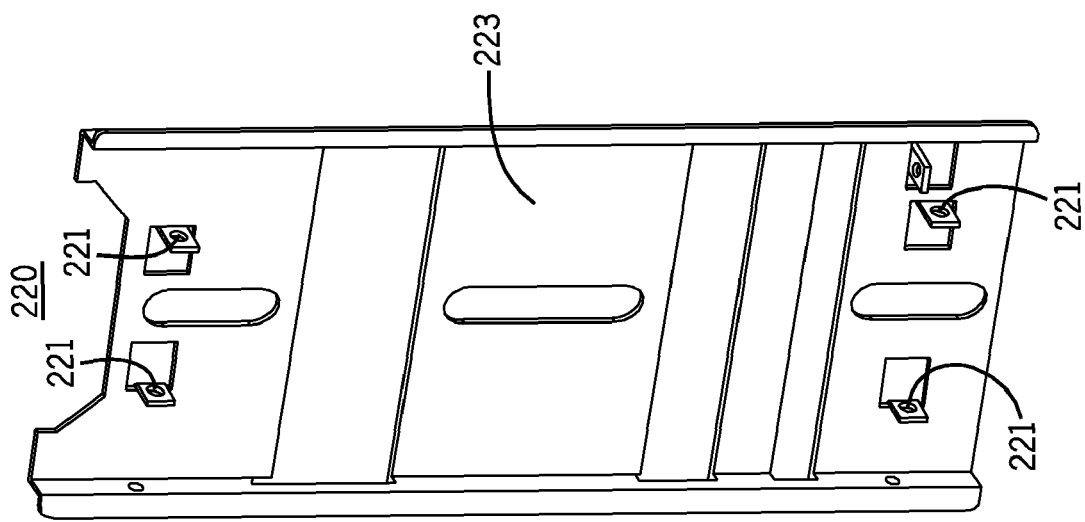
FIG. 12 is a perspective view of a device bracket of the moveable mounting system of FIG. 7B.

With reference to FIGS. 8A, 10 and 12, the lower and upper translation assemblies 240 and 250 are each rotatably coupled to the surface bracket 220 and extend from a device face 223, opposite the mounting surface, of the surface bracket 220. The surface bracket 220 may include a plurality of tabs 221 (shown in FIG. 11) extending from the device face 223. As shown in FIGS. 9B and 9C, axles 249 may be received by two or more of the plurality of tabs 221 and rotatably coupled to the surface bracket 220. As shown in FIG. 8A, one of the axles 249 is coupled to a lower portion of the surface bracket 220 and another of the axles 249 is coupled to an upper portion of the surface bracket 220. The lower translation assembly 240 is rotatably coupled to the axle 249 coupled to lower portion of the surface bracket 220. The upper translation assembly 250 is rotatably coupled to the axle 249 coupled to the upper portion of the surface bracket 220. The link member assembly 260 may also be rotatably coupled to the surface bracket 220 with the axles 249 coupling the lower translation assembly 240. Thus, each of the lower and upper translation assemblies 240 and 250 and the link member assembly 260 are rotatably coupled to the surface bracket 220. Alternatively, the link member assembly 260 may be rotatably coupled to the surface bracket 220 at another axle not coupled to one of the lower and upper translation assemblies 240 and 250. Still further, the lower and upper translation assemblies 240 and 250 and the link member assembly 260 may be directly and rotatably coupled to the surface bracket 220 without the axles 249.

The lower translation assembly 240 and the upper translation assembly 250 operatively connect the surface bracket 220 with the device bracket 230 and permit the device bracket 230 to translate between a retracted orientation proximate the surface bracket 220 and an extended orientation spaced apart from the surface bracket 220. When the surface bracket 220 is attached to a substantially vertical surface such as a wall, the device bracket translates along a substantially horizontal plane extending perpendicular from the wall. Each of the lower and upper translation assemblies 240 and 250 include a friction hinge assembly 255. The friction hinge assembly 255 allows each of the lower and upper translation assemblies 240 and 250 to pivotally open and fold closed. As depicted in FIG. 9B, the device bracket 230 translates away from the surface bracket 220 in a substantially normal direction when the lower and upper translation assemblies 240 and 250 are simultaneously extended. FIG. 9C shows how the device bracket 230 may be tilted downward by orientating an upper portion of the device bracket away from the surface bracket 220, thereby extending the hinge translation assembly 250 to a greater degree than the lower translation assembly 240. The moveable mounting system 15 may be constructed without either a lower translation assembly 240 or an upper translation assembly 250. In such configurations, the moveable mounting system 15 may be limited to tilting in one orientation, for example, a downward tilt. Still further, the moveable mounting system 15 may be constructed with additional translation assemblies, including a medial hinge assembly (not shown).

The lower and upper translation assemblies 240 and 250 may be substantially identical in their construction. However, their construction may also differ. For example, in embodiments, the friction hinge assembly 255 may be absent from one of the lower translation assembly 240 and the upper translation assembly 250. FIG. 10 shows a detailed view of the upper translation assembly 250. The upper translation assembly 250, for example, comprises the friction hinge assembly 255, a hinge member 241, and a hinge link 242. The friction hinge assembly 255 includes a friction hinge 256 and a shaft 257 rotatably coupled to the friction hinge 256. The depicted embodiment shows a pair of the shafts 257 extending from ends of the friction hinge 256. The hinge member 241 is coupled to the friction hinge assembly 255. As shown, the hinge member 241 is affixed to the friction hinge assembly 255 with a plurality of link connecting elements 244. However, in other embodiments, the hinge member 241 may be otherwise attached to or integral with the friction hinge assembly 255. In the depicted embodiment, the shafts 257 are of a "L" shape. Each of the shafts 257 is coupled to a hinge link 242. As shown, the hinge link 242 and the shaft 257 are affixed with a plurality of member connecting elements 245. However, the hinge link 242 may be other wise attached or integral with the shaft 257. Further, the shaft 257 may be substantially straight in various embodiments. In the depicted embodiment, the lower translation assembly 240 is substantially similar to the upper translation assembly 250. The lower translation assembly 240 and the upper translation assembly may be configured such that the hinge link 242 and the hinge member 241 are at least partially nestable when the moveable mounting system 15 is retracted, providing a relatively thin profile as depicted in FIG. 9A.

Figure 11:
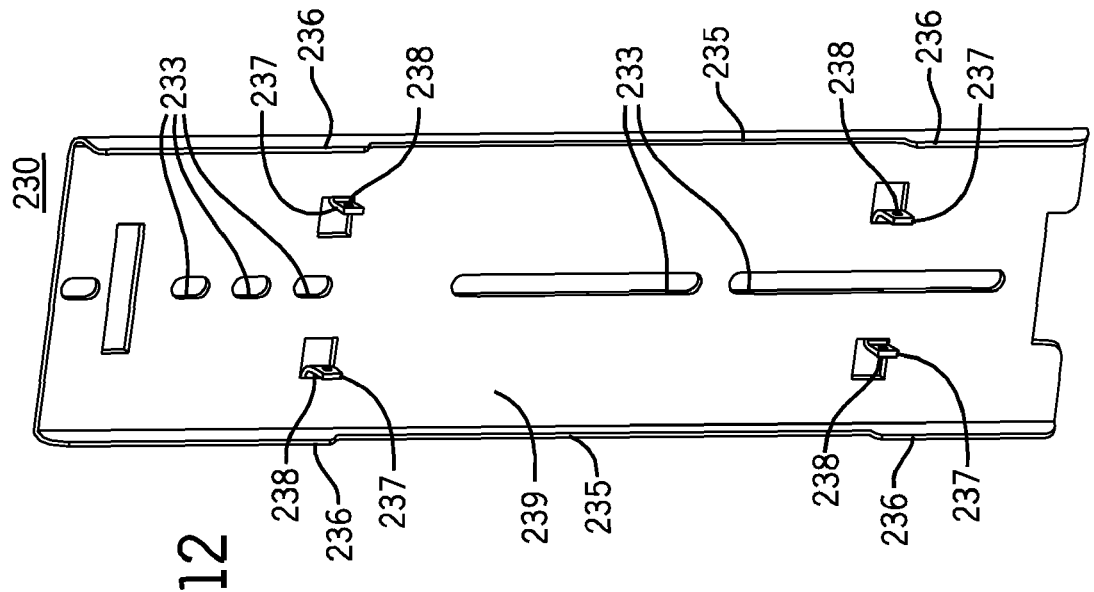
FIG. 11 is a perspective view of a surface bracket of the moveable mounting system of FIG. 7A.

The upper translation assembly 250 is rotatably coupled to an upper portion of the surface bracket 220 and an upper portion of the device bracket 230. With reference to FIGS. 8A, 11 and 12, the hinge member 241 is rotatably coupled to the surface bracket 220 by attachment with one the axles 249 coupled to the surface bracket 220. The axle 249 is received by a plurality of surface member openings 247 in the hinge member 241 that are disposed opposite the friction hinge assembly 255. Each of the hinge links 242 are rotatably coupled to the device bracket 230 by attachment with one the axles 249 coupled to the device bracket 230. The respective axle 249 is received by a plurality of hinge link openings 243 on the hinge link 242 and opposite attachment to the shaft 257.

The lower translation assembly 240 is also rotatably coupled to a lower portion of the surface bracket 220 and a lower portion of the device bracket 230. As depicted, the orientation of the lower translation assembly 240 may be reversed with respect to the upper translation assembly 250. Specifically, the hinge member 241 is rotatably coupled to the device bracket 230 by attachment with another of the axles 249 coupled to the device bracket 230. The axle 249 is received by a plurality of surface member openings 247 in the hinge member 241 that are disposed opposite the friction hinge assembly 255. Each of the hinge links 242 are rotatably coupled to the surface bracket 220 by attachment with another of the axles 249 coupled to the device bracket 230. The axle 249 is received by a plurality of hinge link openings 243 on the hinge link 242, opposite attachment to the shaft 257. In an alternative embodiment that does not include the surface bracket 220, the lower translation assembly 240 and the upper translation assembly 250 are configured to directly or operatively couple to the surface mount 210.

The friction hinge assembly 255 provides a resistive pivotable connection between the hinge member 241 and the hinge link 242. For example, the friction hinge 256 generates a resistance that retards rotation of the shaft 257 relative to the friction hinge 256. The friction hinge assembly 255 thereby resists rotation of the hinge link 242 relative to the hinge member 241. Thus, a selected orientation (tilt and extension) of the device bracket 230 is substantially maintained because the upper translation assembly 250, for example, is substantially prevented from freely or inadvertently opening and folding closed. Instead, the device bracket 230 is selectively tiltable and extendable in relation to the surface bracket 220. The friction hinge assembly 255 maintains the tilt and extension orientation of the device bracket 230, counteracting the force and/or moment generated by the device bracket 230 and an attached device. For example, when the device bracket 230 is orientated as shown in FIG. 9C with a "downward" tilt, the friction hinge assembly 255 counteracts the force of device bracket 230 and attached device (not shown) and resists the lower translation assembly 240 and the upper translation assembly 250 from further opening, maintaining the selected tilt orientation and resisting further inadvertent tilt from occurring. Accordingly, the friction hinge assembly 255 provides a resistively rotatable connection between the hinge member 241 and the hinge link 242.

As shown in FIG. 12, the device bracket 230 is configured for attachment to a device, such as the flat panel display device (not shown). The device bracket 230 may include a plurality of attachment openings 233 to receive one or more connecting elements such as a bolt or screw to attach the device bracket to the flat panel display device or other device. The flat panel display device can be oriented in either a portrait or landscape orientation using the device bracket 230. The plurality of attachment openings 233 may comprise substantially vertically slots in an embodiment to provide attachment points for a variety of devices. The device bracket 230 may include opposing sides 235 extending substantially normal from the face of the device bracket 230 that may be formed by bending a portion of the periphery of the device bracket 230 outwardly. The opposing sides 235 may include a plurality of openings 236 configured to receive the axles 249 and thereby couple the lower translation assembly 240 and the upper translation assembly 250. The device bracket 230 may also include other or additional features to capture the axles 249 or otherwise rotatably couple the lower translation assembly 240 and the upper translation assembly 250. As shown, a plurality of tabs 237 with openings 238 may extend from a face 239 of the device bracket 230. The openings 238 receive the axles 249. In another embodiment, the lower and upper translation assemblies 240 and 250 and the link member assembly 260 are directly and rotatably coupled to the device bracket 230. In yet another embodiment, the device bracket 230 comprises a plate configured for attachment to a device such as a flat panel display device.

Figure 7B:
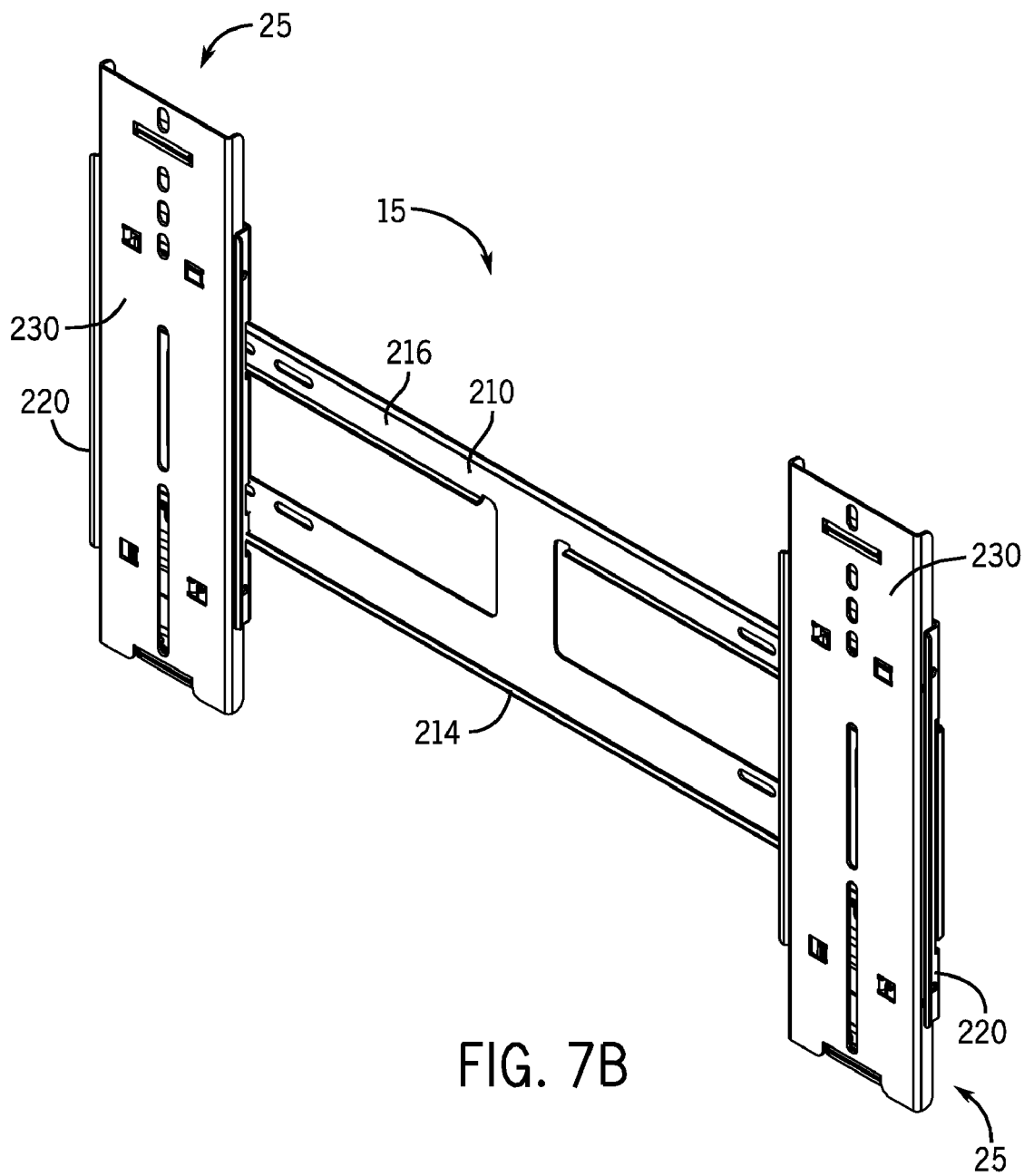
FIG. 7B is a perspective view of the moveable mounting system of FIG. 7A shown in a retracted orientation.

The moveable mounting system 15 may include one or more device brackets 230. As shown in FIG. 7B, the moveable mounting system 15 includes two of the device brackets 230 horizontally spaced apart. In this configuration, each of the device brackets 230 is substantially aligned with corresponding opposing surface bracket 220. The device bracket 230 and opposing surface bracket 220 may be configured such that they are at least partially nestable with each other when the moveable mounting system 15 is in a retracted orientation. For example, as shown in FIGS. 7B and 9A, the surface bracket 220 is narrower than the device bracket 230 and the device bracket 230 is nestable within the surface bracket 220 when the moveable mounting system 15 is in the retracted orientation. Further, the lower and upper translation assemblies 240 and 250 are partially nestable themselves and may also nest within the partially nested surface bracket 220 and the device bracket 230. The moveable mounting system 15 may accordingly achieve a relatively low profile when fully retracted. In other words, a rear surface of a mounted display device may be placed in close proximity to the mounting surface in the fully retracted orientation as depicted in FIG. 9A. Other configurations may also be constructed, for example the moveable mounting system 15 may comprise a plurality or a single device bracket 230 and a single or a plurality of surface bracket 220 to accommodate devices of a variety of dimensions and mass.

With reference to FIGS. 8A and 9B, the link member assembly 260 may comprise one or more link members 261. The link member assembly 260 includes a first connection 262 and a second connection 263 distal the first connection 262. The first connection 262 is rotatably coupled to the surface bracket 220 and the second connection 263 is rotatably coupled to the device bracket 230. As shown in FIG. 9B, the first connection 262 may be coaxial with the axle 249 coupled to the lower translation assembly 240. The second connection 263 may be coaxial with the axle 249 coupled to the upper translation assembly 250. The link member assembly 260 may be configured to at least partially nest within the surface bracket 220 and the device bracket 230 when the moveable mounting system 15 is in a fully retracted orientation. The link member assembly 260 provides additional support for the moveable mounting system 15 in the extended, partially extended and tilted orientations.

Figure 8B:
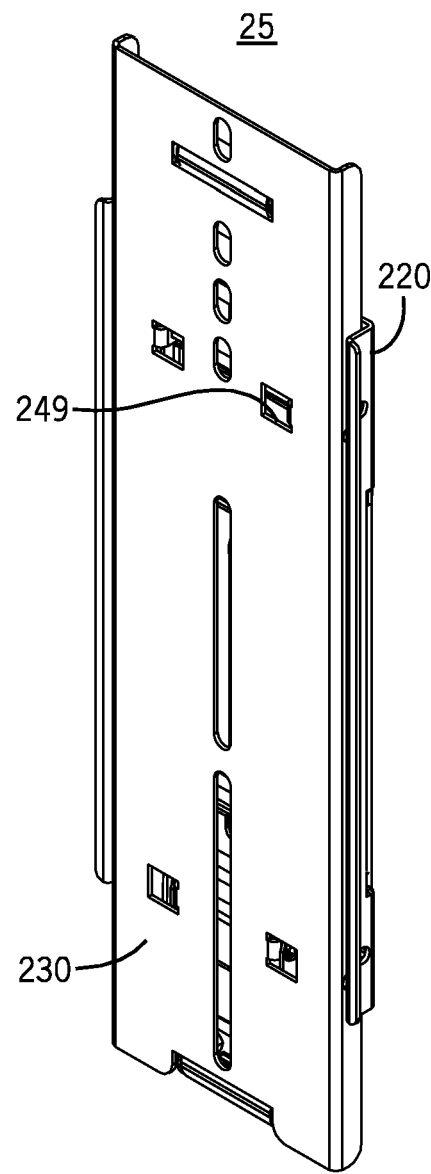
FIG. 8B is a perspective view of a mounting assembly of the moveable mounting system of FIG. 7B.

In an embodiment of the present invention, the moveable mounting system 15 is configured to support a flat panel display device. However, other types of devices may be mounted to the moveable mounting system 20. The weight of the flat panel display device may be distributed among a plurality of mount assemblies 25 as depicted in FIGS. 8A and 8B. As shown in FIG. 9B, the device bracket 230 (and attached device, not shown) may be extended away from the surface bracket 220 (and mounting surface, not shown) by grasping the lower and upper portion of attached device and pulling outward, away from the mounting surface, thereby extending the mount assemblies 25 to the extended orientation of FIG. 8A. Likewise, and as seen in FIG. 9A, pushing the surface bracket 230 toward the surface retracts the mount assemblies 22, folding the lower and upper translation assemblies 240 and 250 and nesting them within the surface bracket 220 and the device bracket 230 to the closed orientation of FIG. 8B. The device may thus be positioned in close proximity to the mounting surface. The device bracket 230 may be tilted downward, as shown in FIG. 9C, when mounted to a substantially horizontal surface by grasping the attached device near the top and pulling outward away from the surface. In various embodiments, the attached device may also be tilted upward by grasping the attached device near the bottom and pulling outward away from the surface. The above adjustments can accommodate a variety of viewing locations and viewing angles. In an embodiment, the device bracket 230 may tilted downward from a orientation substantially coplanar with the mounting surface as much as 30 degrees and upward as much as 30 degrees.

The friction hinge assembly 255 maintains the selected orientation of the device bracket 230, substantially preventing unintentional opening and closing of the lower translation assembly 240 and the upper translation assembly 250. For example, the friction hinge assembly 255 of the lower translation assembly 240 and the upper translation assembly 250 resist rotation of the respective hinge members 241 in relation to the respective hinge links 242, counteracting the downward force of device bracket 230 and any attached device, maintaining the selected tilt orientation as shown in FIG. 9C. The friction hinge assemblies 255 similarly resist rotation of the lower translation assembly 240 and the upper translation assembly 250, maintaining the substantially vertical orientation of the device bracket 230 when extended, as shown in FIG. 9B.

Although the friction hinge assembly 255 serves to help prevent unintentional changes of tilt orientation or extension of the device bracket 230, the friction hinge assembly 255 is generally configured so as not to impede a user from selecting and or changing the tilt orientation and extension of the device bracket 230 or require the user to exert undue force when tilting, extending or retracting an attached device. In fact, the friction hinge assembly 255 may be configured to assist a user in changing the tilt and/or extension orientation of the device bracket in one direction. For example, the friction hinge assembly 255 may be configured such that opening the lower translation assembly 240 and the upper translation assembly 250 requires less user supplied force than closing the lower translation assembly 240 and the upper translation assembly 250. In other words, the resistance provided by the friction hinge assembly 255 may vary between clockwise rotation and counterclockwise rotation. For example, the friction hinge assembly 255 may be configured so that decreasing the downward tilt of the device bracket 230 requires 40 percent less user supplied force than increasing the tilt of the device bracket 230.

In an embodiment, the friction hinge assemblies 255 comprises a self contained high torque friction hinge assembly. In a particular embodiment, the friction hinge assembly 255 comprises a self contained high torque friction hinge assembly of the type available from, for example, Reell Precision Manufacturing Corporation.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, modules and systems.

What is claimed is:

1. A moveable mounting system for attaching a device to a mounting surface, comprising:
   a surface mount adapted for attachment to the mounting surface;
   a first surface bracket operatively connected to the surface mount;
   a second surface bracket operatively connected to the surface mount and spaced apart from the first surface bracket;
   a first plurality of translation assemblies, each of the first plurality of translation assemblies including a first surface member rotatably connected to the first surface bracket, a first device member rotatably connected to a first device bracket, and a first pivot portion rotatably connecting the first surface member and the first device member;
   a second plurality of translation assemblies, each of the translation assemblies including a second surface member rotatably connected to the second surface bracket, a second device member rotatably connected to the device bracket, and a second pivot portion rotatably connecting the second surface member and the second device member;
   a link member rotatably connected at a first connection to the first surface bracket and rotatably connected at a second connection distal the first connection to the first device bracket,
   wherein the moveable mounting system is selectively moveable continuously between an extended orientation, where the first device bracket is disposed a distance from the surface mount, and a retracted orientation, where the device bracket is disposed proximate the surface mount, and wherein the moveable mounting system is selectively moveable between an orientation where the device bracket is substantially coplanar with the surface mount and a tilt orientation where the device bracket is rotated about a substantially horizontal axis relative to the mounting surface.

2. The moveable mounting system of claim 1, further comprising a second device bracket spaced apart from the first device bracket, wherein each of the first and second device members are rotatably connected to the second device bracket.

3. The moveable mounting system of claim 2, wherein the first device bracket and the first surface bracket are at least partially nestable with each other, and wherein the second device bracket and the second surface bracket are at least partially nestable with each other.

4. The moveable mounting system of claim 1, wherein the first plurality of translation assemblies includes a first lower translation assembly and a first upper translation assembly, and wherein the second plurality of translation assemblies includes a second lower translation assembly and a second upper translation assembly.

5. The moveable mounting system of claim 4, wherein the first surface member and the first device member of the first lower translation assembly are partially nestable with each other, wherein the first surface member and the first device member of the first lower translation assembly are partially nestable with each other.

6. The moveable mounting system of claim 4, wherein the first connection is rotatably connected to the first lower translation assembly and the second connection is rotatably connected to the first upper translation assembly.

7. The moveable mounting system of claim 1, wherein the moveable mounting system is selectively moveable between an orientation where the device bracket is substantially coplanar with the surface mount, and an upward tilt orientation, where the device bracket is rotated about a substantially horizontal axis relative to the surface mount.

8. The moveable mounting system of claim 1, wherein the moveable mounting system is downwardly tiltable at least about 10 degrees about a substantially horizontal axis substantially parallel to the mounting surface.

9. The moveable mounting system of claim 1, wherein the movable mounting system is configured to mount a flat panel display device.

10. The moveable mounting system of claim 1, wherein the first and the second surface brackets are selectively positionable over a length of the surface mount.

11. The moveable mounting system of claim 1, wherein at least one of the first pivot portion and the second pivot portion includes a friction hinge assembly.

12. The moveable mounting system of claim 11, wherein the friction hinge assembly resists rotation of the first surface member in relation to first device member, substantially maintaining the tilt orientation.

13. The moveable mounting system of claim 12, wherein the friction hinge assembly is characterized by a greater rotational resistance in a first direction of rotation relative to a second direction of rotation.

14. A moveable mounting system for attaching a device to a mounting surface, comprising:
a surface mount adapted for attachment attachable to the mounting surface;
a first surface bracket operatively connected to the surface mount;
a first device bracket;
a first translation assembly including a first surface member rotatably connected to the first surface bracket, a first device member rotatably connected to the first device bracket, and a pivot portion rotatably connecting the first surface member and the first device member;
a first link member rotatably connected at a first pivot to the first surface bracket and rotatably connected at a second pivot distal the first pivot to the first device bracket; and at least one biasing member operatively connected to the link member,
wherein the moveable mounting system is selectively moveable continuously between a first orientation where the first device bracket is substantially parallel and proximate the surface mount and a tilt orientation where the first device bracket is rotated in relation to the surface mount about a substantially horizontal axis relative to the surface mount, and wherein the at least one biasing member is configured to provide resistance when selectively moving the moveable mounting system between the first orientation and the tilt orientation.

15. The moveable mounting system of claim 14, wherein the substantially horizontal axis is substantially parallel to the surface mount.

16. The moveable mounting system of claim 14, further comprising a second translation assembly, wherein the second translation assembly includes a second surface member rotatably connected to the first surface bracket, a second device member rotatably connected to the first device bracket, and a second pivot portion rotatably connecting the second surface member and the second device member.

17. The moveable mounting system of claim 16, wherein the moveable mounting system is selectively moveable between an extended orientation where the first device bracket is disposed a distance from the surface mount and a retracted orientation where the first device bracket is disposed proximate the surface mount.

18. The moveable mounting system of claim 14, wherein the first device bracket and the first surface bracket are at least partially nestable with each other.

19. The moveable mounting system of claim 14, wherein the at least one biasing member comprises a first biasing member engageable with the first surface bracket, and a second biasing member engageable with the first device bracket.

20. A moveable mounting system for attaching a device to a mounting surface, comprising:
a first surface bracket adapted for operative attachment to the mounting surface;
a first translation assembly including a first surface member rotatably connected at a first surface portion to the first surface bracket, a first device member, and a first friction hinge assembly rotatably coupling the first device member and the first surface member, the first friction hinge assembly including a torsionally biased shaft coupled to one of the first surface member and the first device member, and wherein the other of the first surface member and the first device member is coupled to the first friction hinge assembly;
a first device bracket adapted for operative connection to a device and rotatably connected to a first device portion distal the first friction hinge assembly; and,
a link member rotatably connected at a first connection to the first surface bracket and rotatably connected at a second connection distal the first connection to the first device bracket,
wherein the moveable mounting system is selectively moveable between an orientation, where the first device bracket is substantially coplanar with the mounting surface, and a downward tilt orientation, where the device bracket is rotated about a substantially horizontal axis that is substantially parallel to the mounting surface.

21. The moveable mounting system of claim 20, further comprising a second translation assembly, wherein the second translation assembly includes a second surface member rotatably connected to the first surface bracket, a second device member rotatably connected to the first device bracket.

22. The moveable mounting system of claim 21, wherein the moveable mounting system is selectively moveable between an extended orientation where the device bracket is disposed a distance substantially perpendicular from the mounting surface and a retracted orientation where the device bracket is disposed proximate the mounting surface.

23. The moveable mounting system of claim 20, wherein the first device bracket and the first surface bracket are at least partially nestable with each other.

24. A moveable mounting system for attaching a device to a mounting surface, comprising:

a first surface bracket attachable to the mounting surface;

a first device bracket attachable to a device; and a first hinge assembly operatively coupled to the first surface bracket and operatively coupled to the first device bracket, the first hinge assembly providing a resistive tilting connection between the first device bracket and the first surface bracket such that the first device bracket is selectively extendable and tiltable in relation to the first surface bracket, wherein the first hinge assembly is configured to generate a resistance to assist in maintaining a selected extension and a selected tilt angle of the first device bracket when the device is attached, and wherein the first hinge assembly is characterized by a greater tilting resistance in a first direction of tilt relative to a second direction of tilt.

25. The moveable mounting system of claim 24, further comprising a second hinge assembly operatively coupled to the first surface bracket and operatively coupled to the first device bracket.

26. The moveable mounting system of claim 25, further comprising at least one link member rotatably coupled to the first hinge assembly and rotatably coupled to the second hinge assembly.

27. A moveable mounting system for attaching a device to a mounting surface, comprising:

a surface mount adapted for attachment attachable to the mounting surface;

a first surface bracket operatively connected to the surface mount;

a first device bracket;

a first translation assembly including a first surface member rotatably connected to the first surface bracket, a first device member rotatably connected to the first device bracket, and a first pivot portion rotatably connecting the first surface member and the first device member;

a second translation assembly including a second surface member rotatably connected to the first surface bracket, a second device member rotatably connected to the first device bracket, and a second pivot portion rotatably connecting the second surface member and the second device member; and a first link member rotatably connected at a first pivot to the first surface bracket and rotatably connected at a second pivot distal the first pivot to the first device bracket, wherein the moveable mounting system is selectively moveable continuously between a first orientation where the first device bracket is substantially parallel and proximate the surface mount and a tilt orientation where the first device bracket is rotated in relation to the surface mount about a substantially horizontal axis relative to the surface mount.

* * * * *